(12) United States Patent
Cha et al.

(10) Patent No.: US 8,046,034 B2
(45) Date of Patent: Oct. 25, 2011

(54) SLIDING-TYPE PORTABLE TERMINAL

(75) Inventors: Moon-Young Cha, Anyang-si (KR);
Bum-Lai Cho, Suwon-si (KR);
Sang-Woon Nahm, Seoul (KR);
Ryun-Tae Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1082 days.

(21) Appl. No.: 11/852,077

(22) Filed: Sep. 7, 2007

(65) Prior Publication Data

US 2008/0064456 A1 Mar. 13, 2008

(30) Foreign Application Priority Data

Sep. 7, 2006 (KR) .................. 10-2006-0086212

(51) Int. Cl.
*H04M 1/00* (2006.01)
(52) U.S. Cl. ............... 455/575.4; 455/575.1; 455/575.2; 455/575.3
(58) Field of Classification Search ..... 455/575.1–575.4
See application file for complete search history.

(56) References Cited

U.S. PATENT DOCUMENTS

| | | | | |
|---|---|---|---|---|
| 5,046,556 A * | 9/1991 | Andersson | ..................... | 165/181 |
| 7,428,430 B2 * | 9/2008 | Ahn et al. | .................. | 455/575.4 |
| 7,433,723 B2 * | 10/2008 | Bae | ............................. | 455/575.4 |
| 7,665,913 B2 * | 2/2010 | Kim | ................. | 396/448 |
| 2004/0017329 A1 * | 1/2004 | Fang et al. | ..................... | 343/895 |
| 2005/0164753 A1 * | 7/2005 | Kato | .......................... | 455/575.4 |
| 2008/0058039 A1 * | 3/2008 | Lee et al. | ................... | 455/575.4 |

FOREIGN PATENT DOCUMENTS

| | | |
|---|---|---|
| EP | 1 545 099 | 6/2005 |
| EP | 1 648 145 | 4/2006 |
| JP | 05-284198 | 10/1993 |
| JP | 2003-319042 | 11/2003 |
| KR | 20-0374127 | 1/2005 |
| KR | 1020050056705 | 6/2005 |
| KR | 1020050062284 | 6/2005 |
| KR | 100629241 | 9/2006 |

\* cited by examiner

*Primary Examiner* — Nick Corsaro
*Assistant Examiner* — Munsoon Choo
(74) *Attorney, Agent, or Firm* — The Farrell Law Firm, P.C.

(57) ABSTRACT

Disclosed is a sliding-type portable terminal including a first housing; a second housing coupled to the first housing so as to slide while facing the first housing; and a sliding module for slidably coupling the first and second housings to each other. The sliding module includes a sliding guide mounted on the first housing, the sliding guide having at least one slit extending in a longitudinal direction; a sliding plate mounted on the second housing, the sliding plate being slidably coupled to the sliding guide and facing the sliding guide; and a hook extending from the sliding plate so as to slide in the slit, the hook extending into the first housing via the slit, an end of the hook being bent so as to face an inner surface of the sliding guide.

14 Claims, 10 Drawing Sheets

SLIDING-TYPE PORTABLE TERMINAL

PRIORITY

This application claims priority to an application filed with the Korean Intellectual Property Office on Sep. 7, 2006 and assigned Serial No. 2006-86212, the contents of which are incorporated herein by reference.

BACKGROUND OF THE INVENTION

1. Field of the Invention

The present invention relates to a portable terminal, and more particularly to a sliding-type portable terminal having a pair of housings coupled to each other while being able to slide with request to each other.

2. Description of the Related Art

In general, portable terminals are basically used for mobile communication. However, recent portable terminals can provide not only conventional mobile communication, but also various types of services including multimedia services (e.g. playing music and moving picture files) and financial services (e.g. micro payment, mobile banking).

Portable terminals are classified into bar-type terminals, flip-type terminals, and folder-type terminals according to their appearance. In addition, sliding-type terminals have recently appeared and, together with folder-type terminals, occupy a dominant position in the portable terminal market.

Bar-type terminals have an input/output device (e.g. keypad, transmitter), a display device, and an output device (e.g. receiver), all of which are positioned on a single housing. Although the bar-type terminals have an advantage of simple construction, the fact that a distance must be secured between the transmitter and the receiver for voice communication adversely affects their compactness.

Flip-type terminals have a bar-type body and a flip cover rotatably mounted on the body. Although the flip-type terminals are advantageous in that their input device (e.g. keypad) is covered in a standby mode so as to avoid erroneous operations, the fact that a distance must be secured between their transmitter and receiver for voice communication adversely affects their compactness, as in the case of the bar-type terminals.

Folder-type terminals have a pair of housings coupled to each other so as to fold on and unfold from each other, as well as voice input and output devices positioned on different housings. Such construction easily secures a distance between the transmitter and receiver without degrading the compactness. Therefore, the folder-type terminals have been dominant in the portable terminal market for a long period of time.

Sliding-type terminals have a pair of housings coupled to each other so that they can slide relative to each other, as well as voice input and output devices positioned on different housings. Input device, e.g. the keypad, is adapted to be exposed/covered as the housings slide relative to each other. Therefore, erroneous operations are avoided in a standby mode, and a distance is easily secured between the voice input and output devices in a communication mode without degrading the compactness. For these reasons, the sliding-type terminals have overtaken the folder-type terminals in the market.

Particularly, sliding-type portable terminals have sliding members mounted on their main body and sub-body which are coupled to each other while being able to slide. However, conventional sliding-type portable terminals have a problem in that it is not easy to prevent the sub-body from playing with regard to the main body while maintaining smooth upward/downward sliding movements of the bodies. More specifically, if the play of the sub-body in the forward/rearward or leftward/rightward direction relative to the main body is reduced, the increased frictional force adversely affects the upward/downward sliding movements. If the frictional force is reduced for smooth sliding movements, play in the forward/rearward or leftward/rightward direction inevitably increases.

SUMMARY OF THE INVENTION

Accordingly, the present invention has been made to solve the above-mentioned problems occurring in the prior art, and an aspect of the present invention is to provide a sliding-type portable terminal having a sliding module adapted to minimize play between housings while guaranteeing smooth sliding movements.

In order to accomplish this aspect, there is provided a sliding-type portable terminal including a first housing; a second housing slidably coupled to and facing the first housing; and a sliding module for slidably coupling the first and second housings, wherein the sliding module includes a sliding guide mounted on the first housing, the sliding guide having at least one slit extending in a longitudinal direction of the sliding guide; a sliding plate mounted on the second housing, the sliding plate being coupled to the sliding guide so as the sliding plate slides while facing the sliding guide; and a hook extending from the sliding plate so as the hook slides in the slit, the hook extending into the first housing via the slit, an end of the hook being bent so as to face an inner surface of the sliding guide.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein is omitted for clarity and conciseness.

Figure 1:
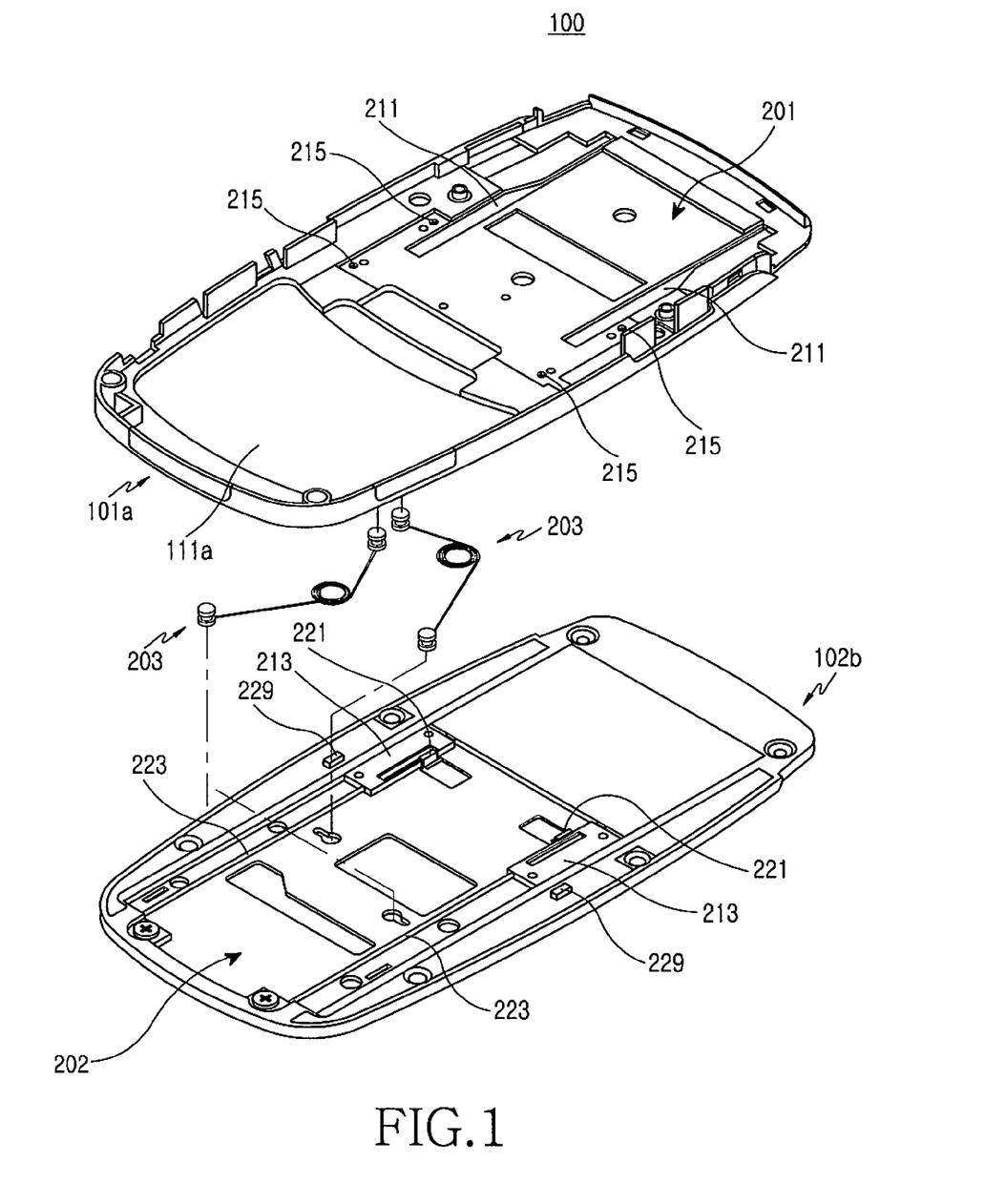
FIG. 1 is an exploded perspective view showing a sliding module for a sliding-type portable terminal according to the present invention.
Figure 10:
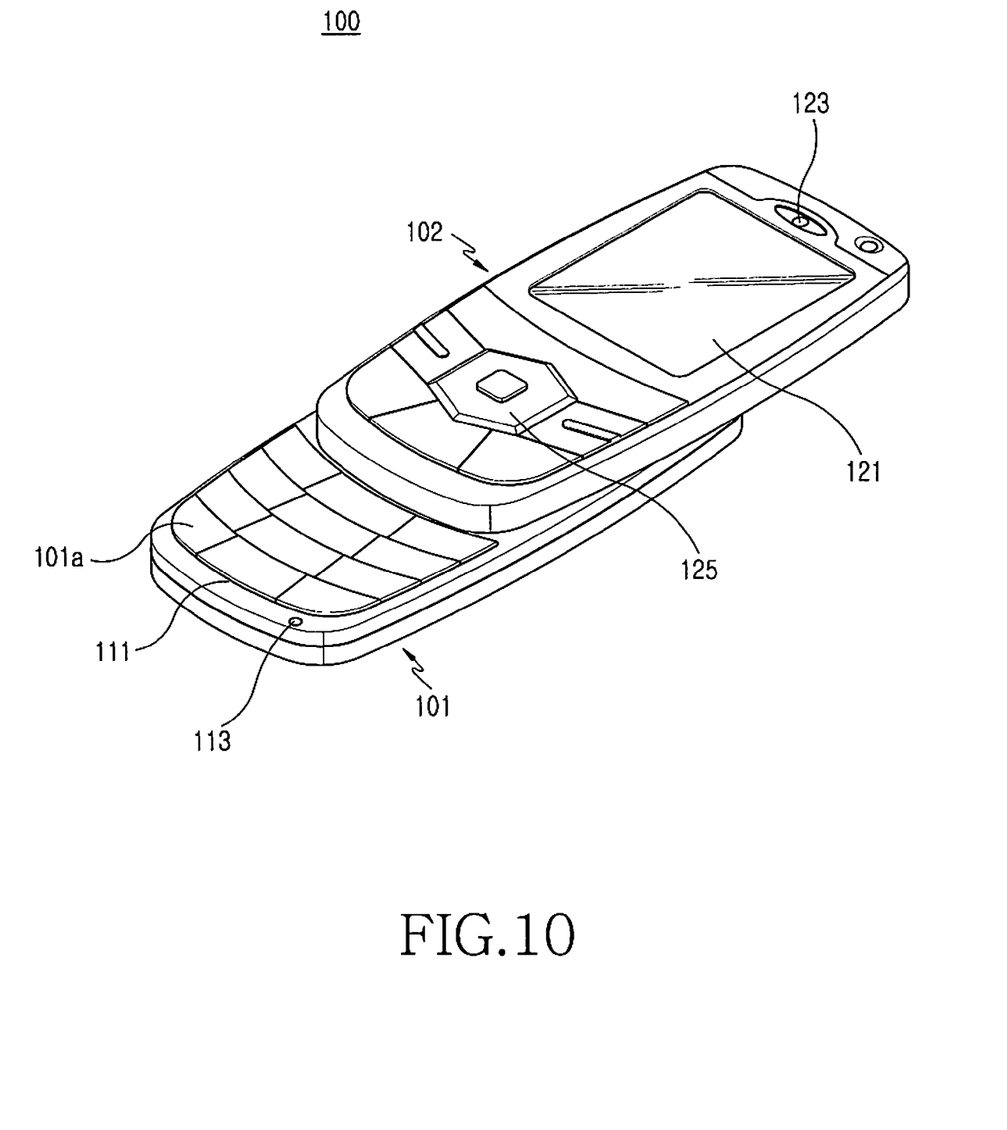
FIG. 10 is a perspective view of the sliding-type portable terminal.

Referring to FIGS. 1 and 10, a sliding-type portable terminal 100 according to the present invention includes first and second housings 101 and 102, respectively, which are slidably coupled to each other by a sliding module interposed between them. It is to be noted that the first and second housings 101 and 102 are shown fully only in FIG. 10 and partially in other figures.

Referring to FIG. 10, the first housing 101 has a keypad 111 positioned on a first surface of the first housing 101 and a microphone device 113 positioned next to the keypad 111. Particularly, the keypad 111 and the microphone device 113 are positioned on a lower portion of the first surface of the first housing 101 so that they are exposed/covered as the second housing 102 slides on the first housing 101.

The second housing 102 has a display device 121 and a speaker device 123 positioned on a top surface of the second housing 102 so as to be always exposed. When the second housing 102 overlaps the first housing 101, the display device 121 and the speaker device 123 remain turned off (i.e. in standby mode) by default. If necessary when the second housing 102 overlaps the first housing 101, the user still can activate the display device 121 and the speaker device 123 by operating a separate key in order to watch broadcasts or moving pictures, for example.

A functional keypad 125 is positioned on the top surface of the second housing 102 and next to the display device 121. The keypad 111 of the first housing 101 includes an array of keys for inputting numerals and characters. The functional keypad 125 includes an array of keys used to call/select menus and search for information. When the second housing 102 exposes the keypad 111 and the like, the terminal 100 switches to a communication mode. Particularly, the keypad 111, the microphone device 113, the display device 121, the speaker device 123, and the functional keypad 125 are activated so that all functions of the terminal 100 are available (e.g. games, voice communication, writing mails).

Referring to FIG. 1, the sliding module includes a sliding guide 201 mounted on the first housing 101 and a sliding plate 202 mounted on the second housing 102. The sliding guide 201 and the sliding plate 202 are slidably coupled to each other while facing each other.

Figure 2:
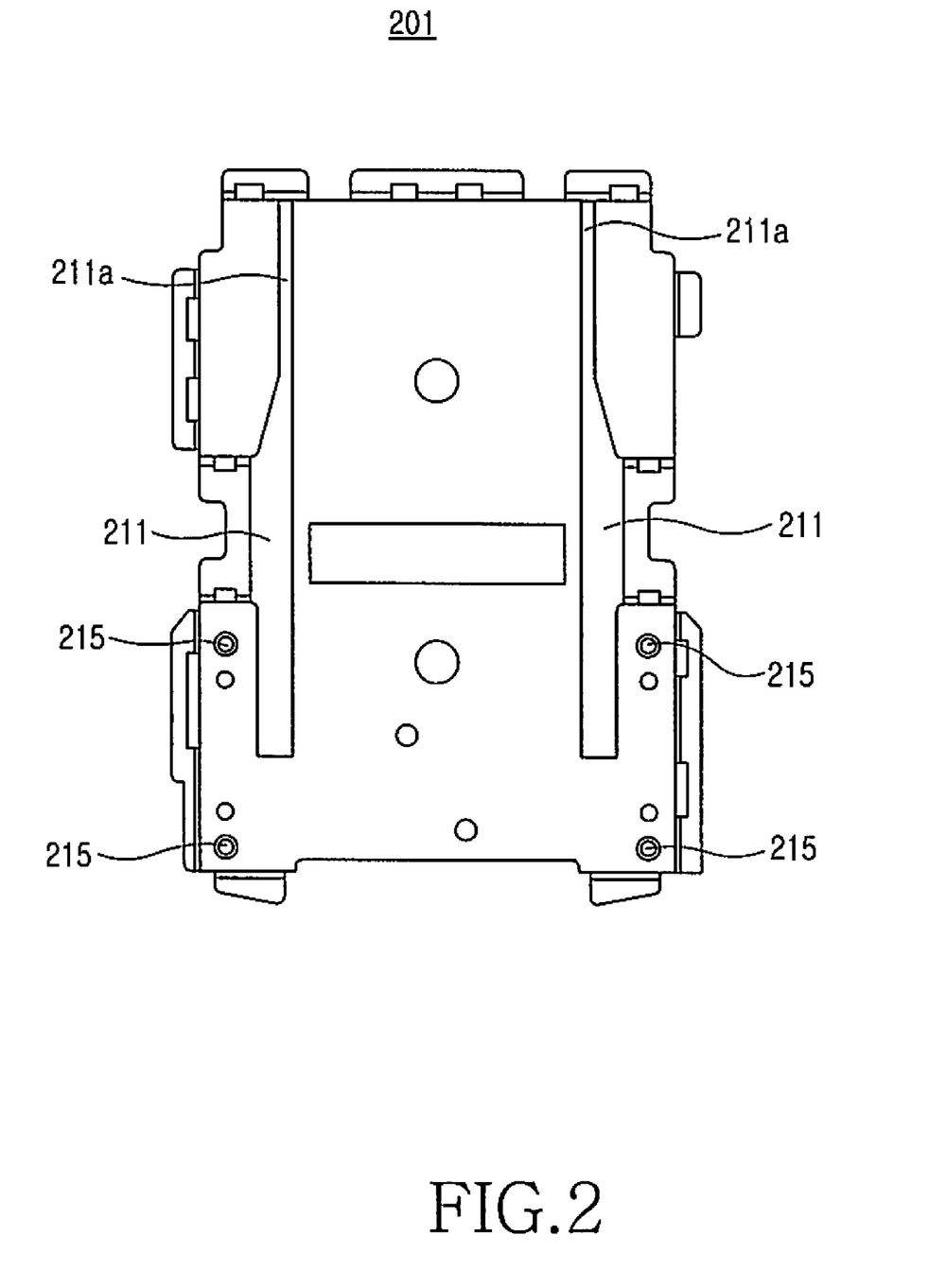
FIG. 2 is a top view of sliding guide 201 of the sliding module shown in FIG. 1.
Figure 3:
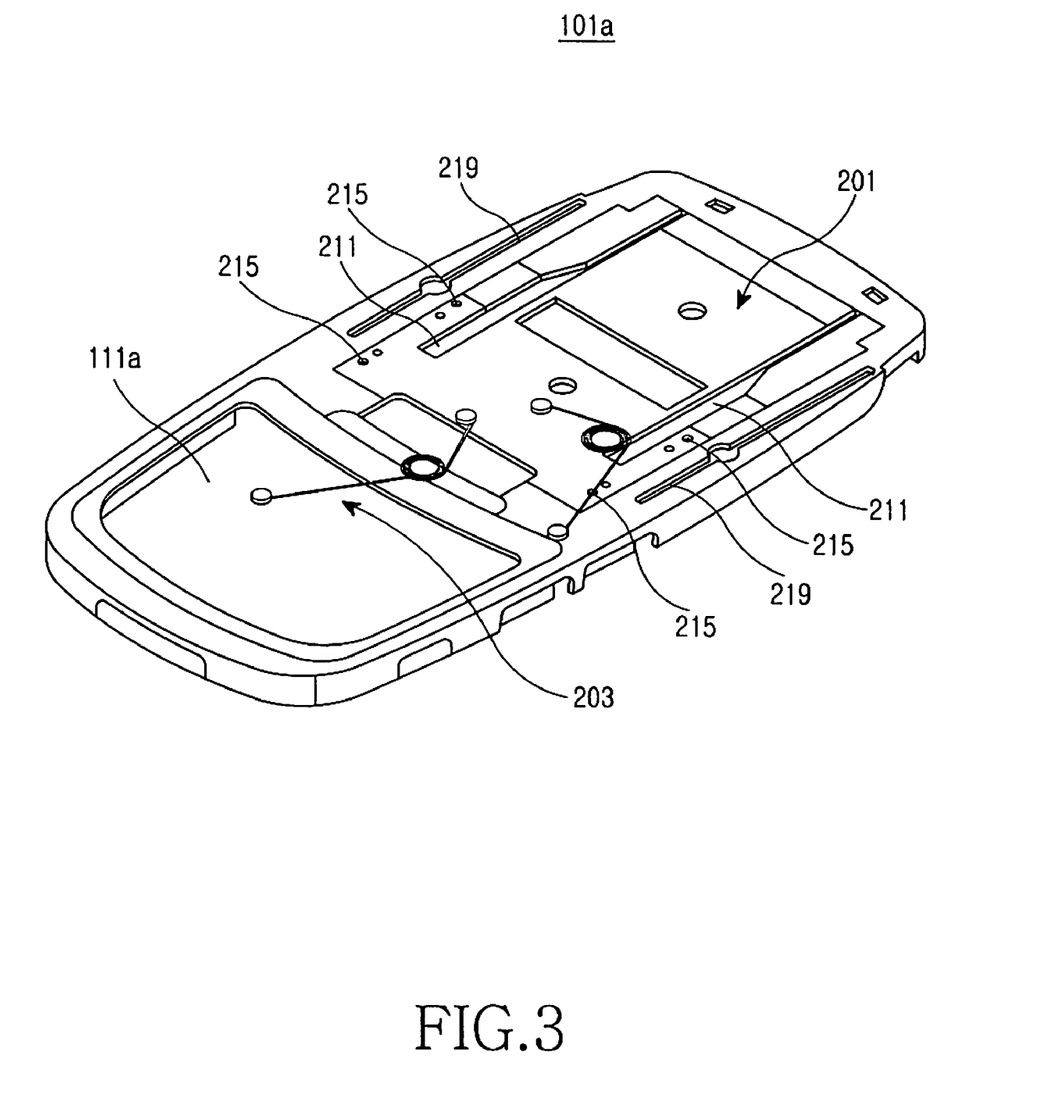
FIG. 3 is a perspective view showing a front case of a first housing of the portable terminal shown in FIG. 1.

Referring to FIGS. 1-3, the sliding guide 201 is mounted on a front case 101a of the first housing 101. The front case 111a has an opening 111a formed on a portion thereof so as to provide a space in which the keypad 111 is mounted. The sliding guide 201 is mounted on another portion of the front case 101a. The front case 101a is so fabricated to expose the portion on which the sliding guide 201 is mounted. After the sliding guide 201 is mounted, the exposed portion of the front case 101a is covered.

The sliding guide 201 may be made of a metallic material, e.g. SUS (stainless using steel). This is because the sliding guide 201, which undergoes direct friction with the sliding plate 202, needs to have durability and mechanical strength.

When the sliding guide 201 is made of a metallic material, it is fabricated through a die casting process, which is suited for high precision and mass production. The front case 101a of the first housing 101 may be fabricated through injection molding by using synthetic resin, for weight reduction of the terminal, etc. When the sliding guide 201 and the front case 101a are made of metal and synthetic resin, respectively, the sliding guide 201 may be mounted as an insert to the front case 101a during an insert injection process of the front case 101a. Those skilled in the art can easily understand that, if necessary, the sliding guide 201 and the front case 101a may be fabricated separately and fastened to each other by fastening elements (e.g. screws).

The sliding guide 201 has slits 211 extending in a longitudinal direction of the sliding guide, particularly in the direction of sliding of the second housing 102. The slits 211 may be formed on both lateral ends of the sliding guide 201 while extending parallel to each other. Preferably, the slits 211 have a width gradually decreasing towards the upper side of the sliding guide 201. This is for the purpose of coupling hooks 221, which are formed on the sliding plate 202, to an end 211a of the slits 211.

The sliding plate 202 is mounted on a rear case 102b of the second housing 102, particularly on the lower side of the rear case 102b. Because the sliding plate 202 has a length corresponding to at least half the length of the second housing 102, the upper end of the sliding plate 202 is positioned on the upper half of the rear case 102b even when the sliding plate 202 is mounted on the lower side of the rear case 102b.

Figure 4:
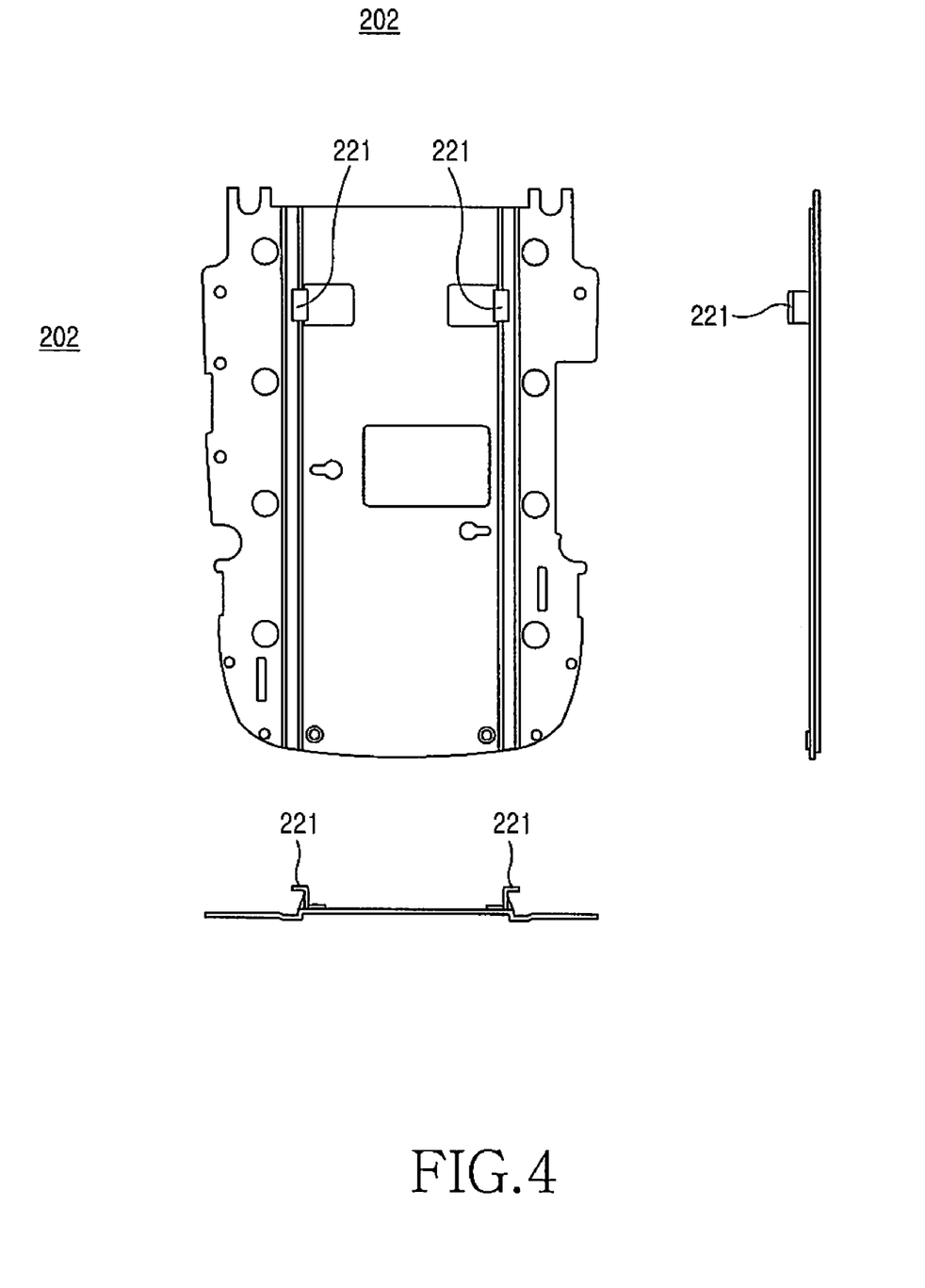
FIG. 4 shows plan, right, and bottom views of a sliding plate of the sliding module shown in FIG. 1.
Figure 5:
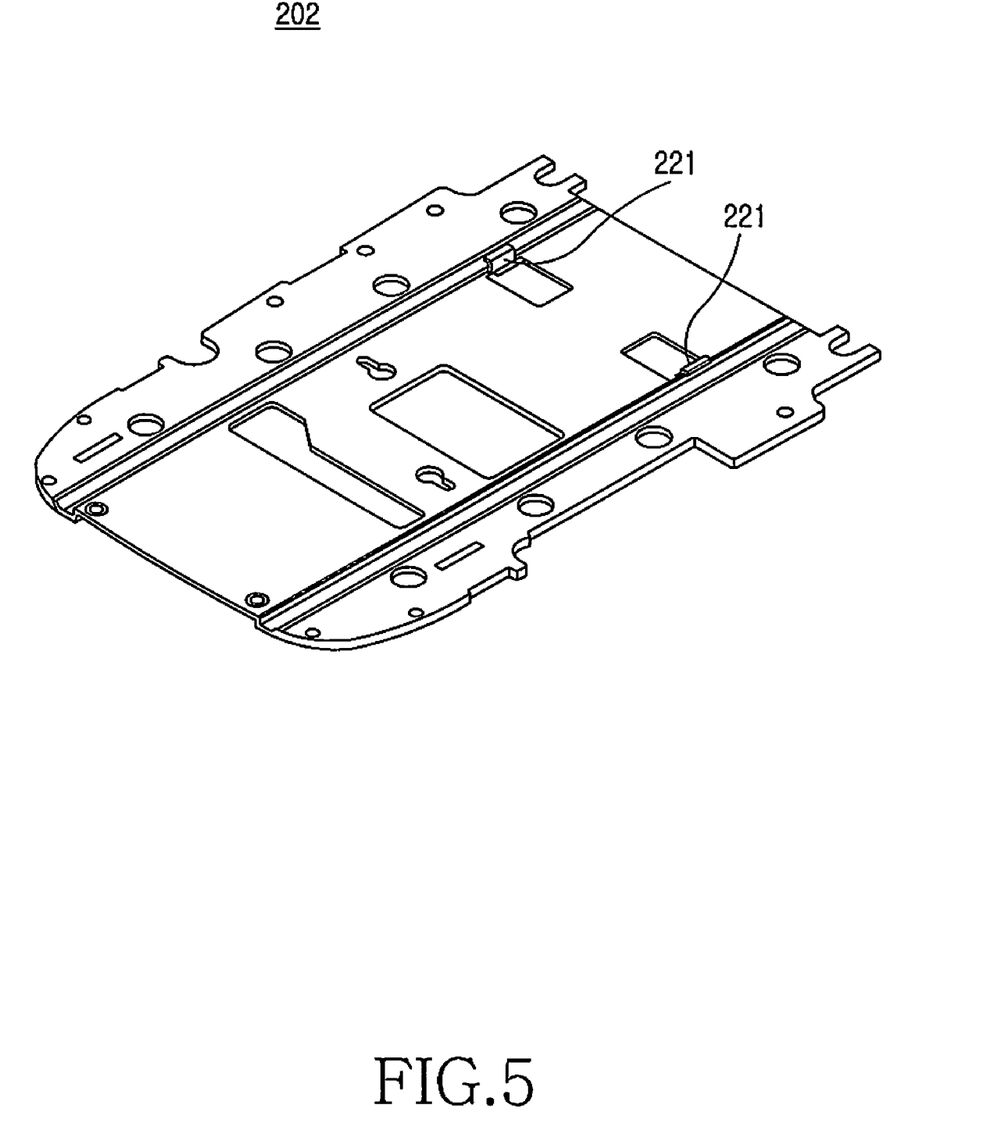
FIG. 5 is a perspective view of the sliding plate shown in FIG. 4.

Referring to FIGS. 4 and 5, the sliding plate 202 has a pair of coupling hooks 221 extending therefrom. Particularly, the hooks 221 extend from a surface of the sliding plate 202 while being parallel to each other, and the free end of each of the hooks 221 is bent away from the other hook.

When the rear case 102b of the second housing 102 is coupled to the front case 101a of the first housing 101, the hooks 221 are positioned inside the first housing 101 via the slits 211, with the free ends of the hooks facing the inner surface of the first housing 101, particularly that of the sliding guide 201. As a result, the hooks 221 are adapted to slide inside the slits 211.

As in the case of the sliding guide 201, the sliding plate 202 may be made of a metallic material, such as SUS, and mounted as an insert to the second housing 102 through an insert injection process of the second housing 102 or by means of a separate fastening element. The rear case 102b is fabricated so as to have an exposed portion, which is covered when the sliding plate 202 is mounted on that portion.

In order to couple the first and second housings 101 and 102 securely and improve the stability of sliding movements, the sliding module may include guide rods 223, guide blocks 213, guide recesses 219, and guide protrusions 229 (FIGS. 1 and 3).

The guide rods 223 are spaced from the sliding plate 202 with both ends of the guide rods 223 fixed to the rear surface of the second housing 102, particularly to the rear case 102b. The guide blocks 213 are mounted on the first housing 101, particularly on the sliding guide 201. The sliding guide 201 has fastening holes 215 formed thereon so as to fasten the guide blocks 213 to the first housing 101.

The guide blocks 213 have sliding holes (not shown) formed so as to extend through them in a longitudinal direction of the guide blocks 213. The guide rods 223 are coupled so that they extend through the sliding holes. Under the guidance of the guide rods 223, the guide blocks 213 slide relative to the sliding plate 202. As the guide rods 223 extend through the sliding holes, the guide blocks 213 are partially interposed between the guide rods 223 and the sliding plate 202.

When mounted on the sliding guide 201, the guide blocks 213 are positioned at the middle of the first housing 101 in the direction of sliding of the second housing 102. Then, the second housing 102 is adapted to slide on the first housing 101 under the guidance of the guide rods 223 and the guide blocks 213, which slide through the guide rods 223.

The sliding range of the guide blocks 213 is limited to a region of the rear case 102b, in which the sliding plate 202 is mounted. Particularly, the surface of the rear case 102b, on which the sliding plate 202 is mounted, is deeper than other portions of the rear case 102b so that the guide blocks 213 can slide only between both ends of the guide rods 223. Although not shown in the drawings, the guide rods 223 have dampers made of an elastic material attached to both ends of the guide rods 223, in order to dampen shock and noise occurring when the ends of the guide blocks 213 collide with the rear case 102b at the ends of the guide rods 223.

The guide rods 223 are preferably made of a metallic material for strength and durability, because both ends of the guide rods 223 are fixed to the second housing 102. In contrast, the guide blocks 213 are preferably made of synthetic resin, which can suppress noise when they undergo direct friction with the sliding guides 201, in such a shape that they can be firmly mounted on the sliding guide 201. Particularly, the guide blocks 213 are preferably made of synthetic resin having excellent lubricant and mechanical properties, such as POM (polyoxymethylene), in order to secure mechanical advantages (e.g. resistance to wear and shock) while guaranteeing smooth sliding movements.

It is to be noted that, although the guide blocks 213 and the guide rods 223 essentially couple the sliding guide 201 and the sliding plate 202 to each other according to the present invention, the slits 211 and the hooks 221 alone can couple the sliding guide 201 and the sliding plate 202 to each other while being able to slide.

Particularly, the free ends of the hooks 221 may be adapted to face the inner surface of the sliding guide 201 in every region of extension of the slits 211 so that the sliding guide 201 and the sliding plate 202 are slidably coupled to each other. As such, the structure for coupling the sliding guide 201 and the sliding plate 202 to each other while being able to slide can be varied as desired.

The guide protrusions 229 are formed on the second housing 102, particularly on the outer surface of the rear case 102b. According to the present invention, a pair of guide protrusions 229 are formed adjacent to both lateral ends of the rear case 102b.

The guide recesses 219 are formed on the first housing 101, particularly on the outer surface of the front case 101a. Specifically, a pair of guide recesses 219 extend parallel to the slits 211 while being adjacent thereto. The position of the guide recesses 219 correspond to that of the guide protrusions 229. In other words, the guide protrusions 229 are positioned in the guide recesses 219. When the second housing 102 slides relative to the first housing 101, the guide protrusions 229 move together with the second housing 102. Therefore, the guide recesses 219 have a length large enough to provide a space in which the guide protrusions 229 can move.

In summary, the guide rods 223, the guide blocks 213, the guide protrusions 229, and the guide recesses 219 guide the sliding movement of the second housing 102 and improve the stability of the sliding movement.

The sliding module has at least one elastic member 203 so as to provide driving force necessary to slide the second housing 102.

The at least one elastic member 203 provides elastic force in a such a direction that both ends of the at least one elastic member 203 move away from each other. Both ends of the at least one elastic member 203 are closest to each other at a location within the range of sliding movement of the second housing 102, particularly between a location at which the second housing 102 overlaps the first housing 101 and that at which the second housing 102 exposes the keypad 111 and the microphone device 113.

According to the present invention, the at least one elastic member 203 includes a coil and a pair of free ends extending from both ends of the coil away from each other. Each of the free ends is coupled to one of the sliding guide 201 and the sliding plate 202. The coil accumulates elastic force acting in such a direction that the free ends move away from each other. Those skilled in the art can easily understand that, in addition to the above-mentioned type of elastic member 203 including a coil and free ends, any type of elastic member (e.g. compressed coil spring, zigzag spring, push rod) capable of providing elastic force in such a direction that both ends move away from each other can be used for the sliding-type terminal according to the present invention.

The free ends of the at least one elastic member 203 are away from each other when the second housing 102 overlaps the first housing 101, as well as when the second housing 102 exposes the keypad 111 and the like of the first housing 101. The free ends are closest to each other at a location between both conditions.

When the second housing 102 slides from a location at which it overlaps the first housing 101 to a location at which the free ends are closest to each other, the elastic member 203 provides driving force for moving the second housing 102 in such a direction that it overlaps the first housing 101. Similarly, when the second housing 102 slides from a location at which the second housing 102 exposes the keypad 111 and the like of the first housing 101 to a location at which the free ends are closest to each other, the elastic member 203 provides driving force for moving the second housing 102 in such a direction that it exposes the keypad 111 and the like of the first housing 101.

FIGS. 6 to 9 show the sliding module for a sliding-type portable terminal according to the present invention, before and after a sliding movement, with the front case 101a of the first housing 101 and the rear case 102b of the second housing 102 coupled to each other.

Figure 6:
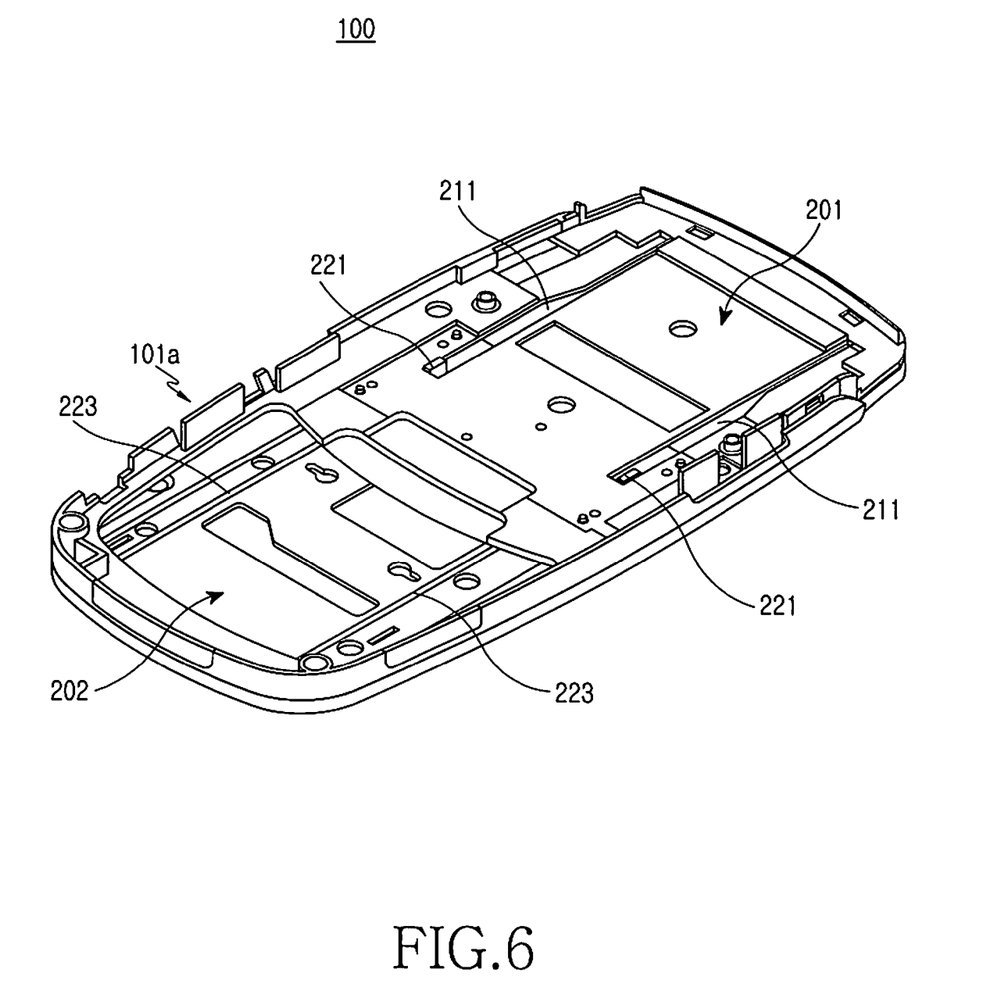
FIG. 6 is an assembled perspective view of the sliding module for a sliding-type portable terminal shown in FIG. 1.
Figure 7:
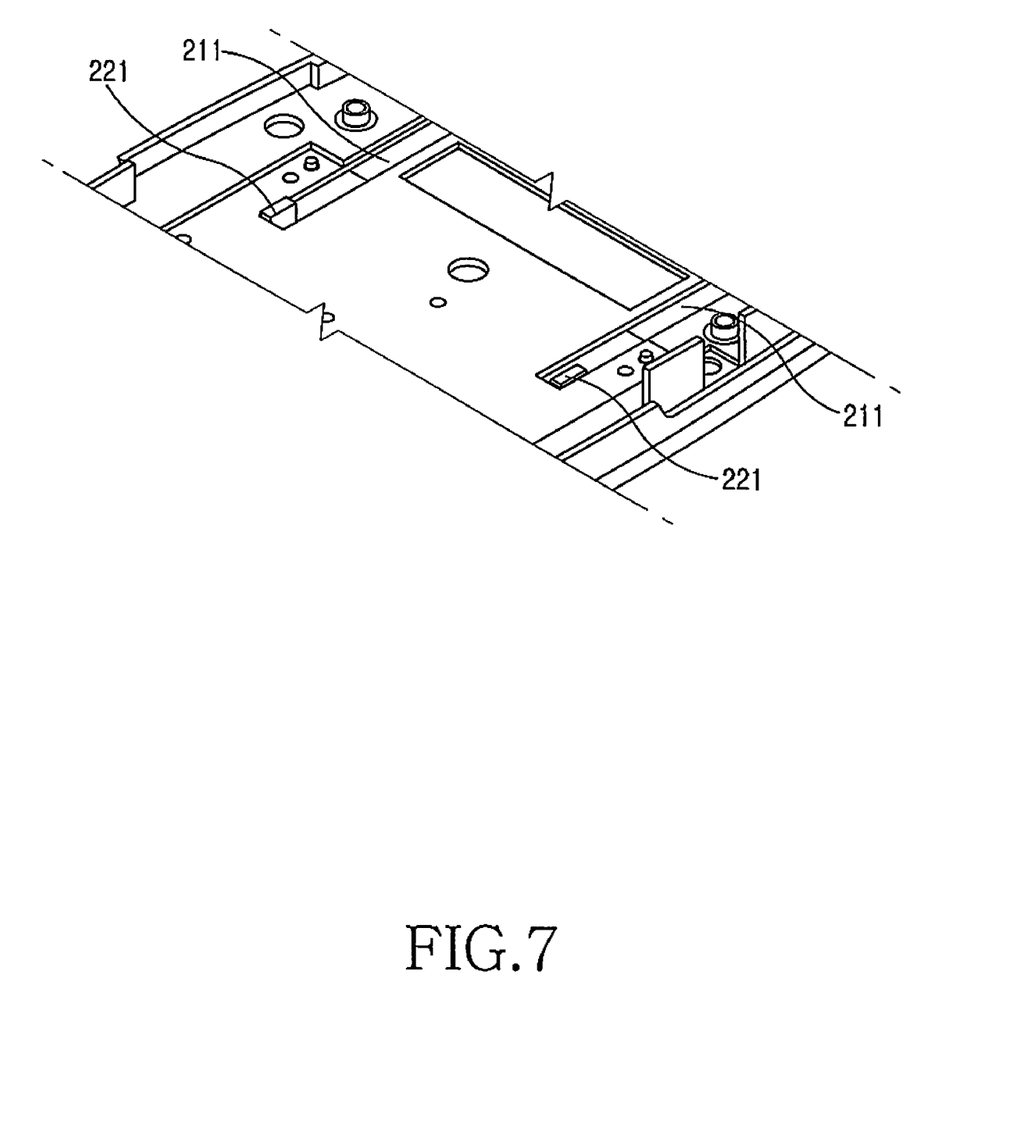
FIG. 7 is a perspective view magnifying a major portion of the sliding module shown in FIG. 6.

Referring to FIGS. 6 and 7, when the second housing 102 overlaps the first housing 101, the hooks 221 are positioned on the lower side of the slits 221 near the guide blocks 213. In this case, the hooks 221 do not face the inner surface of the sliding guide 201, because the width of the lower end of the slits 211 is larger than that of the upper end.

The guide blocks 213 are mounted on the central portion of the first housing 101 near both lateral ends thereof. Therefore, when the second housing 102 overlaps the first housing 101, the second housing 102 is supported in such a manner that the guide blocks 213 are located about the middle of the first housing 101.

Figure 8:
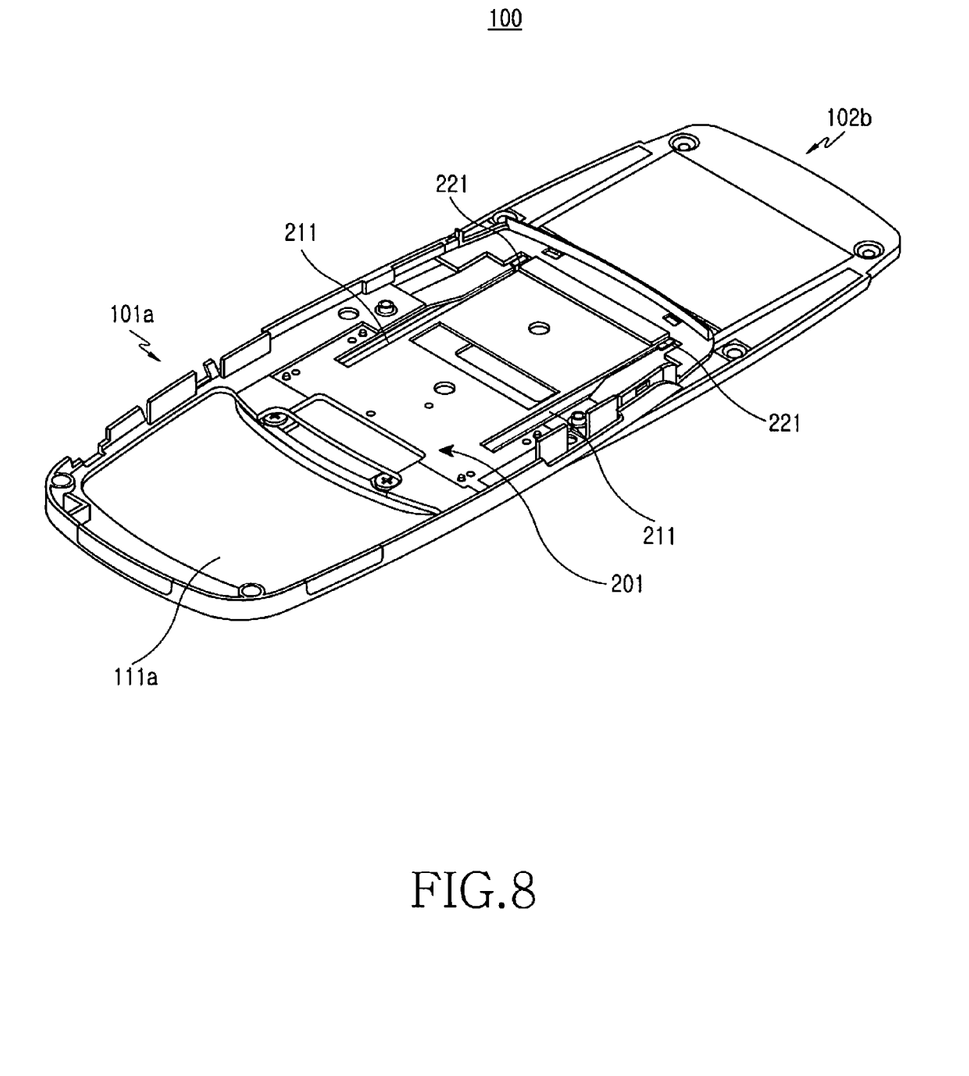
FIG. 8 is a perspective view of the sliding module shown in FIG. 6 after its sliding plate has slid.
Figure 9:
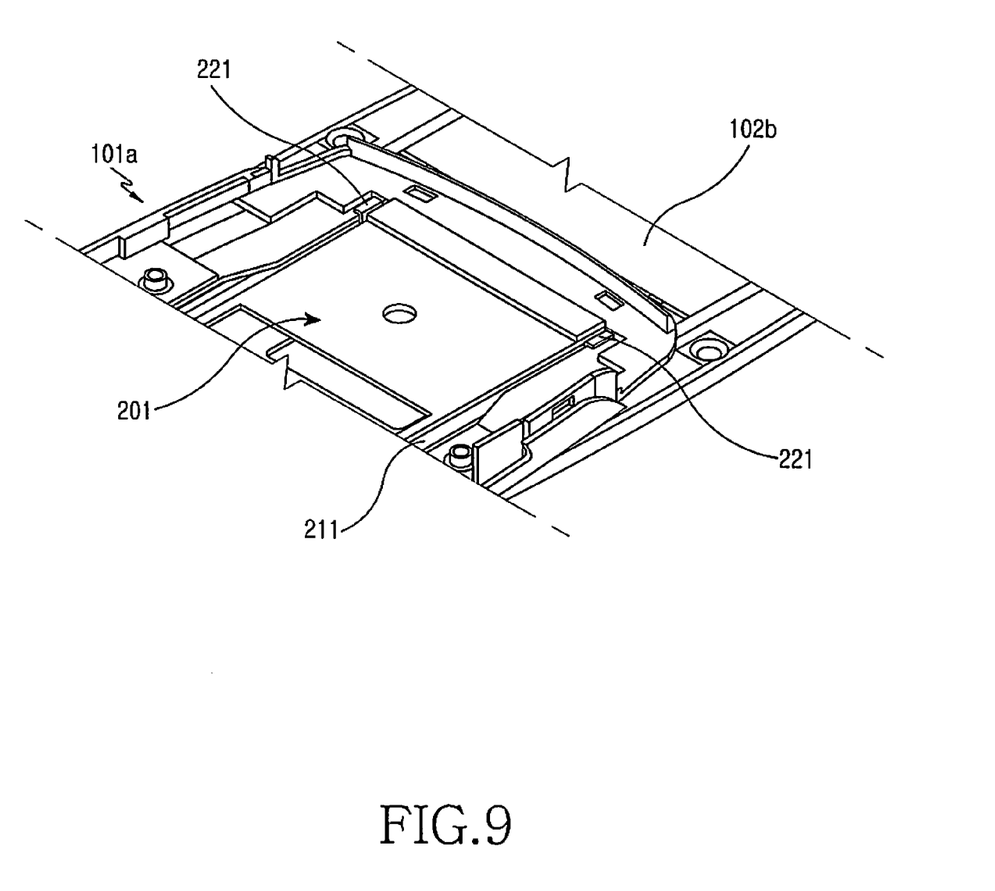
FIG. 9 is a perspective view showing a major portion of the sliding module shown in FIG. 8.

When the rear case 102b of the second housing 102 slides towards the upper side of the first housing 101 as shown in FIGS. 8 and 9, the hooks 221 also move upwards until they are closer to the upper side than the guide blocks 213. The slits 211 have a width gradually decreasing in the upward direction and, at the upper end 211a, the width corresponds to the thickness of the hooks 221. As a result, when the keypad 111 and the like are completely exposed, the hooks 221 engage with the slits 211.

When the keypad 111 is completely exposed, the guide blocks 213 support the lower end of the second housing 102 so that it remains engaged with the first housing 101. When the second housing 102 is supported by the guide blocks 213 at about the middle of the second housing 102, the second housing 102 can remain in a stable condition even when there is some play between the first and second housings.

In contrast, when the keypad 111 is exposed, the second housing 102 is supported by the guide blocks 213 at its lower end. This means that the degree of play of the upper end of the second housing 102 is more severe when the keypad 111 is exposed than when the second housing 102 overlaps the first housing 101.

Therefore, the sliding-type portable terminal 100 according to the present invention has a sliding module adapted to use the slits 211 and the hooks 221 and minimize play of the second housing 102, so that the first and second housings 101 and 102 are stably coupled to each other even when open. Particularly, when the keypad 111 and the like of the first housing 101 are exposed, the hooks 221 support the second housing 102 at a location higher than the guide blocks 213. Therefore, the second housing 102 is supported by the guide blocks 213 at its lower end, as well as by the slits 211 at the middle, when the keypad 111 and the like are exposed. Therefore, play of the second housing 102 is minimized.

Since the guide blocks 213 and the sliding plates 202 are mounted at the middle of the first housing 101 and on the lower side of the second housing 102, respectively, components of the sliding module are not exposed to the outside even when the second housing 102 moves towards the upper side of the first housing 101.

As mentioned above, the sliding-type portable terminal according to the present invention is advantageous in that the sliding module is not exposed to the outside even when the housings slide. This improves the exterior design of the terminal. In addition, the slits and hooks respectively formed on the sliding guide and the sliding plate, which constitute the sliding module, engage with each other and minimize play between the housings so that the housings can slide smoothly while being coupled to each other stably.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A sliding-type portable terminal comprising:
a first housing;
a second housing coupled to the first housing so the second housing slides while facing the first housing; and
a sliding module for slidably coupling the first and second housings to each other, wherein the sliding module comprises:
a sliding guide mounted on the first housing, the sliding guide having a plurality of slits extending parallel to each other and in a longitudinal direction of the sliding guide;
a sliding plate mounted on the second housing, the sliding plate being coupled to the sliding guide so the sliding plate slides while facing the sliding guide; and
a plurality of hooks extending from the sliding plate so as each of the hooks slides in one of the slits, each of the hooks extending into the first housing via one of the slits, a free end of each of the hooks being bent so as the free end faces an inner surface of the sliding guide.

2. The sliding-type portable terminal as claimed in claim 1, wherein the plurality of slits is a pair of slits extending parallel to each other, the plurality of hooks is a pair of hooks extending parallel to each other from an outer surface of the sliding plate, and the free end of each of the hooks is bent away from an other hook.

3. The sliding-type portable terminal as claimed in claim 2, wherein the slits have a width gradually decreasing towards an upper side of the sliding guide, and the width of the slits corresponds to a thickness of the hooks.

4. The sliding-type portable terminal as claimed in claim 1, wherein the sliding module further comprises:
a plurality of guide recesses formed on the first housing so the guide recesses extend parallel to the slits; and
a plurality of guide protrusions formed on the second housing so the guide protrusions slide in the guide recess, respectively.

5. The sliding-type portable terminal as claimed in claim 4, wherein a pair of slits extend parallel to each other, and a pair of guide recesses are formed adjacent to the slits.

6. The sliding-type portable terminal as claimed in claim 1, wherein the sliding module further comprises:
a plurality of guide rods having both ends fixed to the second housing while being spaced from the sliding plate; and
a plurality of guide blocks mounted on the sliding guide and slidably coupled to the guide rods, respectively, the guide blocks having a sliding hole formed so that the guide rod can extend through the sliding hole.

7. The sliding-type portable terminal as claimed in claim 6, wherein the guide blocks are made of polyoxymethylene.

8. The sliding-type portable terminal as claimed in claim 6, wherein the second housing is adapted to slide from a first location, the second housing overlapping the first housing at the first location, to a second location, the second housing exposing a lower portion of a first surface of the first housing at the second location, the hooks being positioned adjacent to the at least one guide block at the first location, and the hooks being adapted to move from a position adjacent to the guide blocks to a position on an upper side of the guide blocks when the second housing slides towards the second location.

9. The sliding-type portable terminal as claimed in claim 1, wherein the sliding module further comprises at least one elastic member having a first end supported on the sliding guide and a second end supported on the sliding plate so as to provide elastic force in such a direction that both ends of the at least one elastic member move away from each other, and the both ends are closest to each other at a location within a sliding range of the second housing.

10. The sliding-type portable terminal as claimed in claim 9, wherein the at least one elastic member comprises a coil portion and a pair of free ends extending from both ends of the coil portion away from each other.

11. The sliding-type portable terminal as claimed in claim 1, wherein the first housing is fabricated so that a first surface is exposed, and after the sliding guide is mounted on the first housing, the sliding guide covers the first surface.

12. The sliding-type portable terminal as claimed in claim 1, wherein the sliding guide is made of stainless using steel, the first housing is made of synthetic resin, and the sliding guide is mounted as an insert to the first housing during insert injection molding of the first housing.

13. The sliding-type portable terminal as claimed in claim 1, wherein the second housing is fabricated so as to have an exposed portion which is covered when the sliding plate is mounted on the exposed portion.

14. The sliding-type portable terminal as claimed in claim 1, wherein the sliding plate is made of stainless using steel, the second housing is made of synthetic resin, and the sliding plate is mounted as an insert to the second housing during insert injection molding of the second housing.

* * * * *